United States Patent [19]

Herd

[11] Patent Number: 5,434,251

[45] Date of Patent: Jul. 18, 1995

[54] SYMMETRIC AZO DYESTUFFS

[75] Inventor: Karl-Josef Herd, Odenthal-Holz, Germany

[73] Assignee: Bayer Aktiengesellschaft, Leverkusen, Germany

[21] Appl. No.: 42,025

[22] Filed: Apr. 2, 1993

[30] Foreign Application Priority Data

Apr. 14, 1992 [DE] Germany .................. 42 12 465.4
Jun. 3, 1992 [DE] Germany .................. 42 18 310.3

[51] Int. Cl.⁶ .................. C09B 62/507; C09B 62/08; D06P 1/38

[52] U.S. Cl. .................. 534/566; 534/568; 534/570; 534/637; 534/642; 534/644; 534/593; 534/600; 8/549

[58] Field of Search ............... 534/566, 570, 637, 642, 534/644; 8/549

[56] References Cited

U.S. PATENT DOCUMENTS

| | | | |
|---|---|---|---|
| 4,754,024 | 6/1988 | Schwander | 534/642 |
| 5,003,053 | 3/1991 | Springer et al. | 534/638 |
| 5,107,025 | 4/1992 | Herd | 564/440 |
| 5,210,187 | 5/1993 | Patsch et al. | 534/642 X |
| 5,278,291 | 1/1994 | Herd | 534/642 X |

FOREIGN PATENT DOCUMENTS

| | | |
|---|---|---|
| 0431389 | 6/1991 | European Pat. Off. |
| 0051808 | 7/1984 | Germany. |
| 0197418 | 3/1989 | Germany. |

Primary Examiner—Mary C. Lee
Assistant Examiner—Fiona T. Powers
Attorney, Agent, or Firm—Sprung Horn Kramer & Woods

[57] ABSTRACT

Symmetric azo dyestuffs of the formula

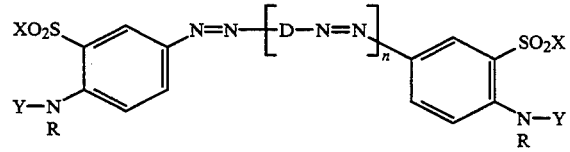

wherein the substituents have the meaning given in the description, produce improved dyeings or prints on wool and cellulose materials.

5 Claims, No Drawings

SYMMETRIC AZO DYESTUFFS

The present invention relates to new polyfunctional fibre-reactive mono- and polyazo dyestuffs.

Poly- and bifunctional mono- and polyazo reactive dyestuffs are already known from an extensive literature, reference being made in particular to EP-A-197,418, EP-A-51,808, U.S. Pat. No. 4,754,024 and U.S. Pat. No. 5,107,025. However, the known dyestuffs still leave something to be desired in respect of applications properties.

The present invention relates to polyfunctional fibre-reactive mono- and polyazo dyestuffs which, in the form of the free acid, correspond to formula (1)

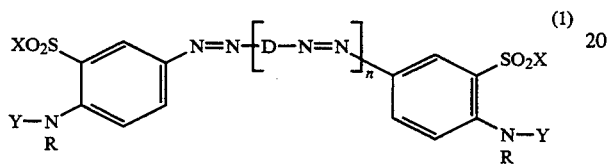

wherein $n = 0$ or 1, $X = CH=CH_2$ or $CH_2CH_2OSO_3H$, $Y = H$, $C_1$-$C_6$-alkyl, $C_1$-$C_6$-alkyl which is substituted by Cl, OH, CN, $CO_2H$, $OSO_3H$, $SO_3H$, $SO_2X$ or $C_1$-$C_4$-alkoxy, allyl, cycloalkyl, such as, for example, cyclohexyl, cyclopentyl or cyclopropyl, cycloalkyl which is substituted by $CO_2H$, $OSO_3H$ or $SO_3H$, benzyl or benzyl which is substituted by OH, $CO_2H$ or $SO_3H$, but in particular $CH_2CH_2OSO_3H$, and $R = H$, $C_1$-$C_4$-alkyl, $C_1$-$C_4$-alkyl which is substituted by Cl, OH, CN, $CO_2H$, $OSO_3H$, $SO_3H$, $SO_2X$ or $C_1$-$C_4$-alkoxy, allyl, benzyl or benzyl which is substituted by OH, $CO_2H$ or sulpho, but in particular H.

In the context of the abovementioned definition, the substituent Y can in each case have the same or a different meaning, as can the substituent R.

The grouping NR—Y also represents a saturated N-heterocyclic radical, such as, for example,

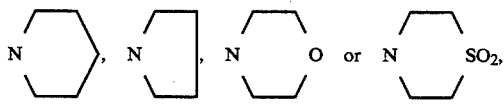

$D$ = abivalent aromatic or heteroaromatic radical, in particular a carbocyclic or heterocyclic central component typical for disazo dyestuffs, such as, for example, a radical having the structure

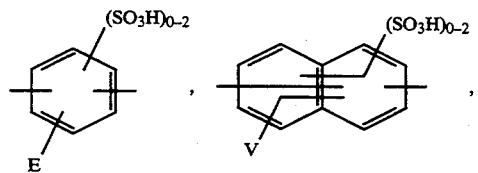

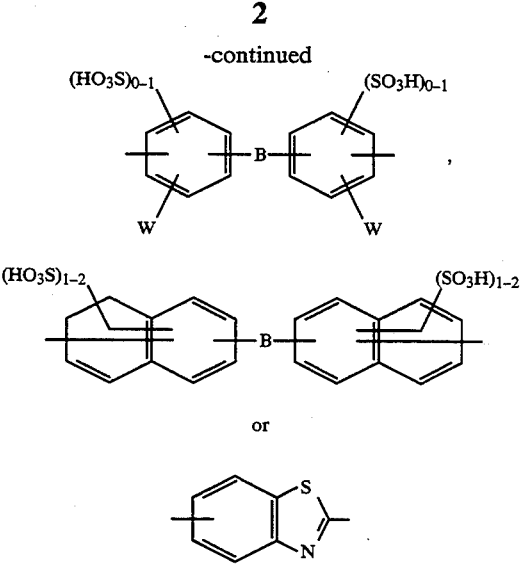

E, V, W = independently of one another, hydrogen or a substituent typical for carbocyclic radicals, B = a direct bond or a bridge member, such as, for example, $CH_2$, $CH_2$—$CH_2$, $CH=CH$, $C\equiv C$, O, S, SO, $SO_2$, CO, $CO_2$, $OCH_2CH_2O$, $CH_2OCH_2$, $CH_2CH_2OCH_2CH_2$, NHCO, NHCONH, $NR^1$, $N=N$, $N=N\rightarrow O$, $O\leftarrow N=N\rightarrow O$, NHCOCONH,

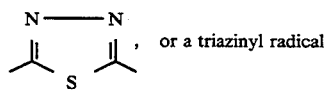

having the structure 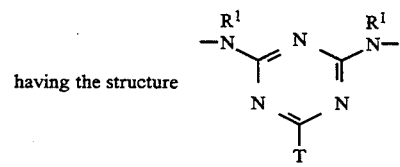

wherein $R^1$ = in each case independently of one another, H or $C_1$-$C_4$-alkyl and $T = F$, Cl, Br, $OR^2$, $SR^2$ or $NR^3R^4$, $R^2H$, $C_1$-$C_6$-alkyl, $C_1$-$C_6$-alkyl which is substituted by OH, halogen, $C_1$-$C_4$-alkoxy, $CO_2H$, $SO_3H$ or $OSO_3H$, cyclohexyl, furfuryl, phenyl, phenyl which is substituted by OH, $CO_2H$, $SO_3H$, $C_1$-$C_4$-alkyl or $C_1$-$C_4$-alkoxy, or naphthyl which is substituted by OH, $CO_2H$ or $SO_3H$ or is unsubstituted, $R^3$ and $R^4$ = independently of one another, hydrogen, $C_1$-$C_6$-alkyl, $C_1$-$C_4$-alkenyl, $C_1$-$C_6$-alkyl which is substituted by halogen, OH, $CO_2H$, $SO_3H$, $OSO_3H$, methoxy, ethoxy, $SO_2Z$ or $OCH_2CH_2SO_2Z$, cyclohexyl, cyclopentyl, benzyl, phenyl or naphthyl, or phenyl, benzyl or naphthyl which is substituted by $C_1$-$C_4$-alkyl, $C_1$-$C_4$-alkoxy, halogen, $CO_2H$, $SO_3H$, $SO_2Z$ or $CH_2SO_2Z$, and wherein $R^3$ and $R^4$, together with the N atom, can form the radical of a 5- or 6-membered heterocyclic ring, such as, for example,

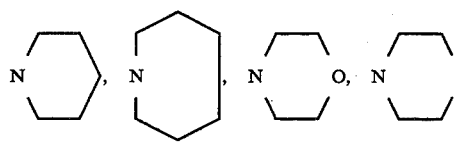 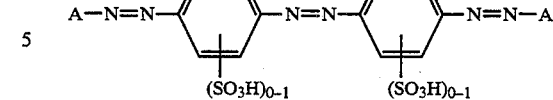

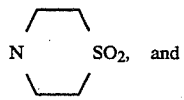

Z=CH=CH$_2$, CH$_2$CH$_2$OSO$_2$H or CH$_2$CH$_2$Cl.

Possible substituents for E, V or W are, for example, C$_1$-C$_4$-alkyl, C$_1$-C$_4$-alkoxy, halogen or carboxyl.

Preferred dyestuffs are those having the structure (2) to (6)

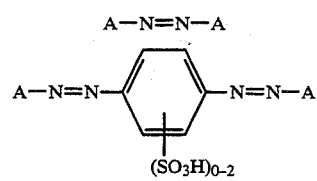

(2)
(3)

(4)

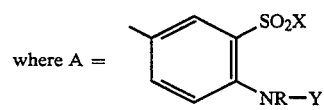

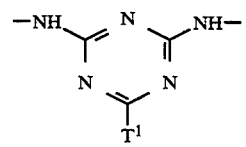

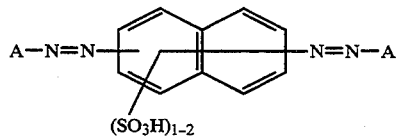

where A = and B$^1$ = a direct bond or CH$_2$CH$_2$, CH=CH, CO, SO$_2$, NHCONH or a triazinyl radical having the structure wherein
T$^1$ = Cl, F, OH or NR$_3$R$^4$ and
X = CH=CH$_2$ or C$_2$H$_4$OSO$_3$H, and wherein
R, Y, R$^3$ and R$^4$ have the abovementioned meaning.

Particularly preferred dyestuffs are the following new reactive dyestuffs having the structure (7) to (14)

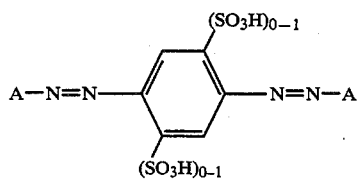

(7)

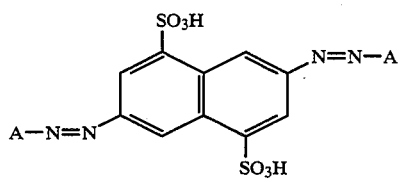

(8)

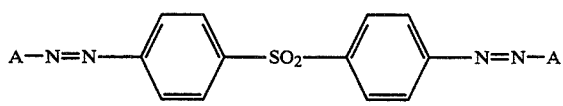

(9)

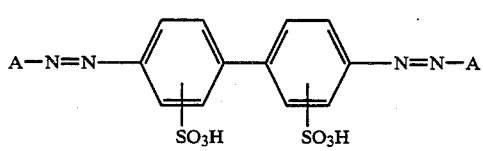

(10)

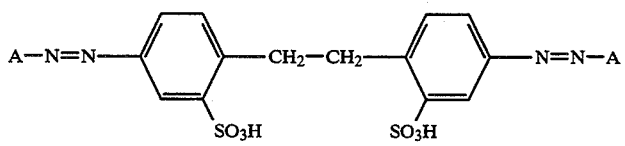

(11)

-continued

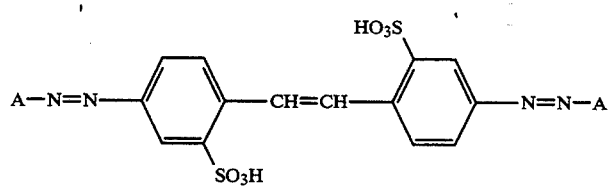 (12)

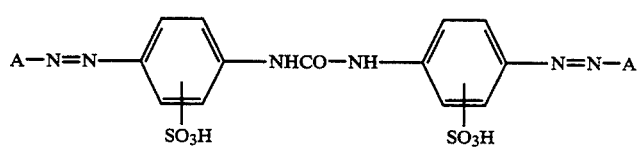 (13)

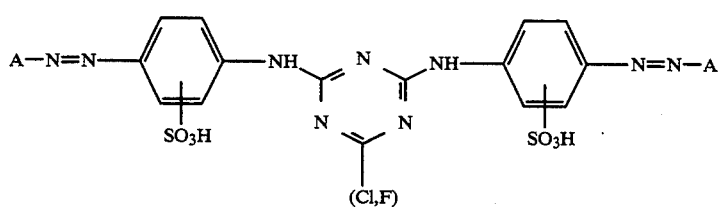 (14)

wherein A has the above meaning, but in particular denotes

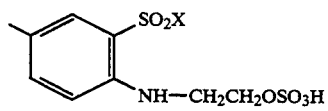

The dyestuffs can be prepared by various methods, to which the invention likewise relates:

1. Sulphation of intermediate products of the formula (15) which are not fibre-reactive and contain hydroxyethyl groups, to give the fibre-reactive dyestuffs of the formula (1) where $X=CH_2CH_2OSO_3H$, and if appropriate conversion into those where $X=CH=CH_2$ under weakly alkaline conditions.

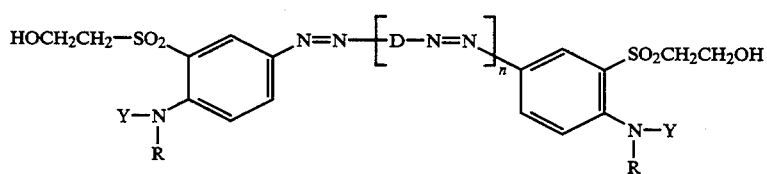

In this process, hydroxyalkyl groups in R and Y are likewise converted into sulphatoalkyl groups.

The synthesis of (15) where n=0, R=H and $Y=CH_2CH_2OH$ is described, for example, in DE-A 3,939,966.

Dyestuff intermediate products having the structure (15) where n=1 can be prepared a) by tetrazotisation of diamino compounds $H_2N—D—NH_2$, coupling to two equivalents of component (16)

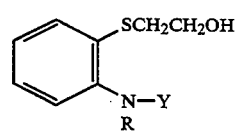 (16)

and oxidation of the resulting bismercapto compounds having the structure (17)

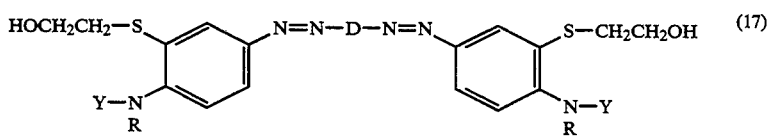 (17)

b) by diazotisation of aminoazo intermediate products having the structure (18) or (19)

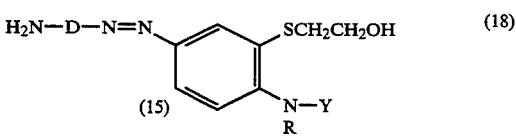 (18)

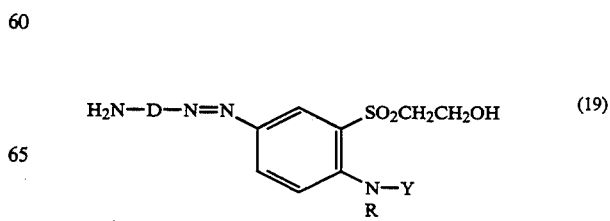 (19)

coupling of the diazonium salts to (16) and subsequent oxidation of the resulting mercapto compounds (17) or (20)

Intermediate products (19) are obtained, for example, by direct oxidation of azo-sulphides having the structure (18), or by diazotisation of $O_2N—D—NH_2$ or acyl-

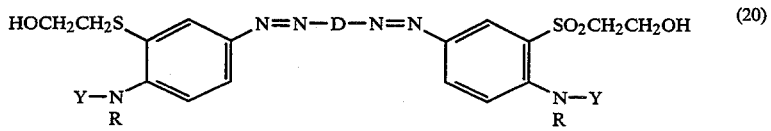 (20)

c) by condensation of two equivalents of the compounds (19) with carbonic acid derivatives, such as, for example, phosgene, with oxalyl chloride or terephthaloyl chloride or with triazines of the formula (21)

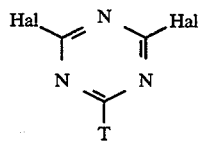 (21)

wherein Hal=Cl, Br or F and T has the meaning as under formula (1),
or with triazines of the formula (24)

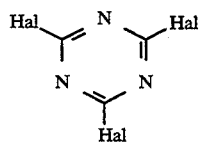 (24)

wherein, in the last case, condensation with $HOR^2$, $HSR^2$, or $HNR^3R^4$ can follow, or d) by condensation of 2 equivalents of the compounds (18) with carbonic acid derivatives, such as, for example, phosgene, or with oxalyl chloride or terephthaloyl chloride to give compounds of the formula (17), and subsequent oxidation.

Intermediate products (18) are obtained by diazotisation of $O_2N—D-NH_2$ or acyl-NH—D—$NH_2$, coupling of the diazonium salt to (16) and subsequent reduction of the nitro group in (25) or hydrolysis of the acylamino group in (26)

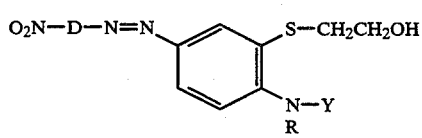 (25)

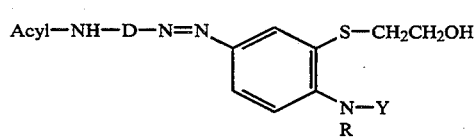 (26)

wherein acyl preferably has the meaning acetyl, oxalyl, benzoyl or formyl.

NH—D—$NH_2$, coupling of the diazoniumsalts to (16), oxidation to sulphones having the structure (27) or (28) and final reduction of the nitro group in (27) or hydrolysis of the acylamino group in (28).

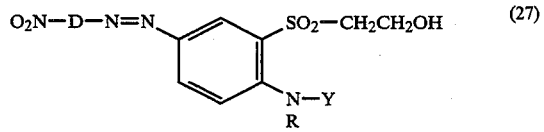 (27)

(28)

Trisazo compounds having the structure (15) or (17) in which the bridge member B in D represents an azo or azoxy grouping are obtained, for example, by reducing together nitro compounds (25) or (27) in which the radical D contains no bridge members B.

2. Diazotisation of amino compounds having the structure (29) or (30)

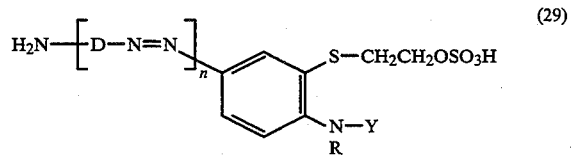 (29)

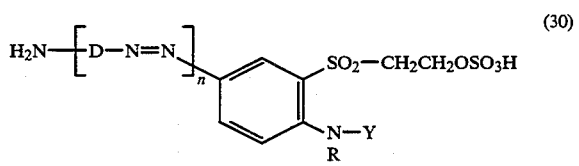 (30)

which are accessible by sulphation of (18) or (19) or (31)

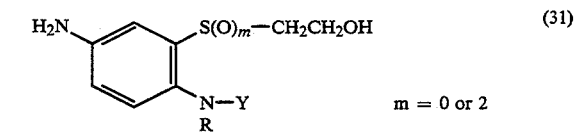 (31)

m = 0 or 2 coupling of the diazonium salts to (16) and oxidation and sulphation of the intermediate stages having the structure (32) or (33)

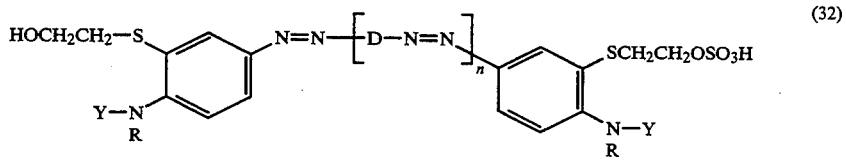

(32)

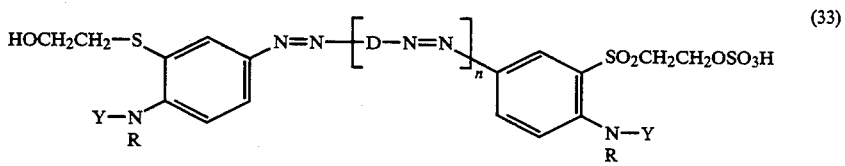

(33)

In this procedure, hydroxyalkyl groups in R or Y are also sulphated.

3. Condensation of 2 equivalents of the aminoazo compounds (30) where n=1 with carbonic acid derivatives, such as, for example, phosgene, with oxalyl chloride or terephthaloyl chloride or with triazines (21) and with triazines (24), it being possible for condensation with $HOR^2$ $HSR^2$ or $HNR^3R^4$ to take place in the last case.

4. Condensation of 2 equivalents of the aminoazo compounds (29) where n=1 with carbonic acid derivatives, such as, for example, phosgene, or with oxalyl chloride or terephthaloyl chloride and oxidation of the resulting bis-mercapto compounds (34)

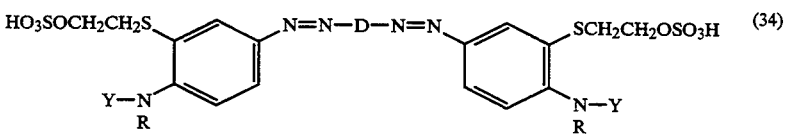 (34)

(34) is also accessible by sulphation of corresponding derivatives having the structure (17). In this procedure, hydroxyalkyl groups in the substituents R and Y are likewise converted into sulphatoalkyl groups.

The sulphation reactions are preferably carried out with concentrated sulphuric acid, sulphuric acid monohydrate, oleum or sulphur trioxide. For oxidation of the sulphides into the sulphones, hydrogen peroxide is preferably employed under tungstate catalysis, and the reaction is carried out in an aqueous medium. Reduction together of nitro compounds having the structure (25) and (27) to give trisazo/azoxy derivatives is most advantageously carried out with mild reducing agents, such as, for example, dextrose, maltose or sucrose. Sodium sulphide or sodium hydrogen sulphide is preferably used for reduction of nitroazo compounds to give the corresponding aminoazo compounds. The diazotisation, tetrazotisation and azo coupling reactions are carried out by processes which are known from the literature.

The coupling components (16) can be prepared by ethoxylation of o-aminothiophenol and N-substituted o-aminothiophenols with ethylene oxide or chloroethanol under alkaline conditions. Component (16) where R=H and Y=CH$_2$CH$_2$OH is accessible by reaction of benzothiazole, ethylene oxide and water and subsequent hydrolysis of the resulting N-formyl compound (compare DE-A 3,939,966).

Another possibility for the preparation of compounds (16) comprises alkylation of precursors of the formula

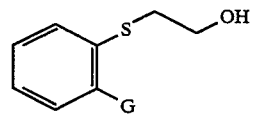

wherein G=NH$_2$, NHR or NHY.

The alkylation can be carried out, for example, with alkyl halides R-Hal or Y-Hal, wherein Hal=Cl, Br or F, with alkyl sulphates or dialkyl sulphates, with activated olefins, such as, for example, acrylic acid derivatives or vinylsulphonyl derivatives, or reductively with aldehyde derivatives.

Preferred coupling components (16) are those in which the radicals R and Y are substituted by a sulpho, carboxyl or, in particular, by a hydroxyl group. Examples of (16) are:

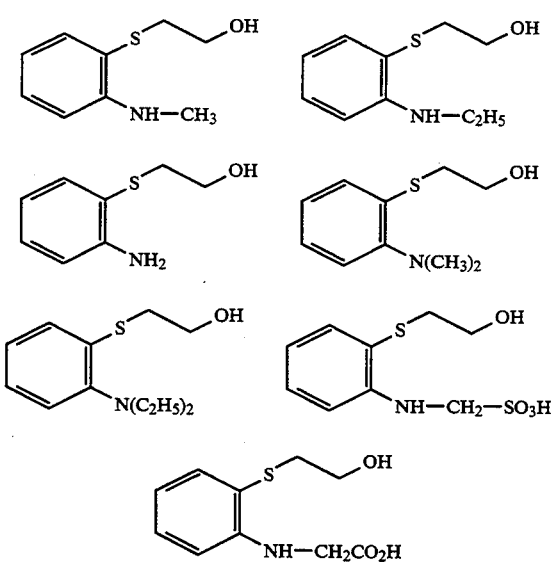

-continued

[Structures in column 11:]
- 2-(2-hydroxyethylthio)phenyl-NH-CH₂-CH₂-CO₂H
- 2-(2-hydroxyethylthio)phenyl-NH-(CH₂)₃-CO₂H
- 2-(2-hydroxyethylthio)phenyl-NH-CH₂CH₂-SO₃H
- 2-(2-hydroxyethylthio)phenyl-N(CH₂CO₂H)₂
- 2-(2-hydroxyethylthio)phenyl-N(CH₂CH₂CO₂H)₂
- 2-(2-hydroxyethylthio)phenyl-N(CH₃)-CH₂-CO₂H
- 2-(2-hydroxyethylthio)phenyl-N(CH₃)-CH₂CH₂-CO₂H
- 2-(2-hydroxyethylthio)phenyl-N(C₂H₅)-CH₂CH₂-SO₃H
- 2-(2-hydroxyethylthio)phenyl-NH-CH₂CH₂-CN
- 2-(2-hydroxyethylthio)phenyl-NH-CH₂CH₂-OCH₃
- 2-(2-hydroxyethylthio)phenyl-NH-cyclohexyl -continued

[Structures in column 12:]
- 2-(2-hydroxyethylthio)phenyl-NH-allyl
- 2-(2-hydroxyethylthio)phenyl-N(allyl)₂
- 2-(2-hydroxyethylthio)phenyl-N-morpholinyl
- 2-(2-hydroxyethylthio)phenyl-N-(thiomorpholine-S,S-dioxide)
- 2-(2-hydroxyethylthio)phenyl-N-pyrrolidinyl
- 2-(2-hydroxyethylthio)phenyl-NH-CH₂-phenyl
- 2-(2-hydroxyethylthio)phenyl-NH-CH₂-CH(CH₃)-CO₂H
- 2-(2-hydroxyethylthio)phenyl-NH-CH(CH₃)-CH₂-CO₂H
- 2-(2-hydroxyethylthio)phenyl-NH-CH₂CH₂-SO₂-CH₂CH₂-OH
- 2-(2-hydroxyethylthio)phenyl-N(CH₃)-CH₂CH₂-SO₂-CH₂CH₂-OH

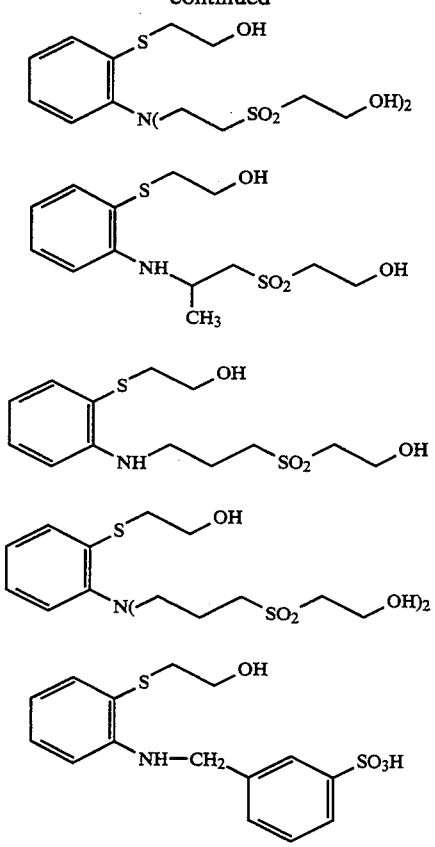
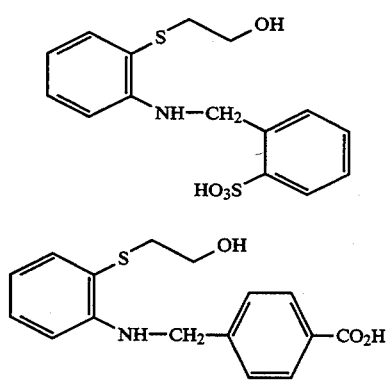
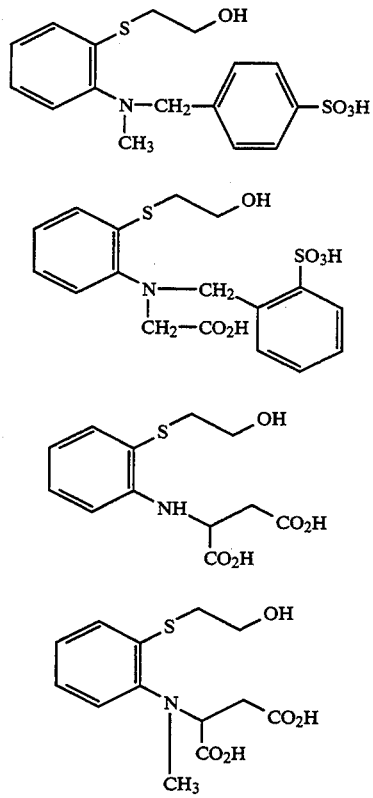
The invention also relates to the intermediate components having the structure (15), (17) to (20), (25) to (30) and (32) to (34), and the following general formulae
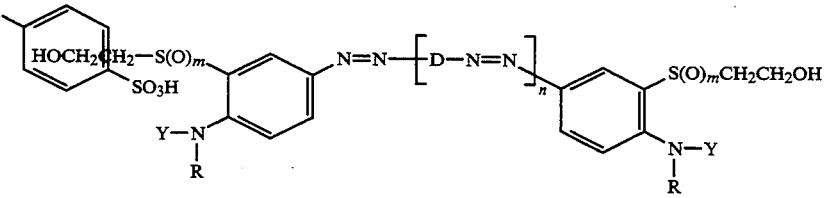
wherein
m = independently of one another, 0 or 2,
n = 0 or 1 and
R, Y and D have the meaning given under formula (1).
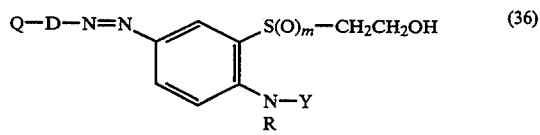
wherein
m = 0 or 2,
Q = NH₂, NO₂ or NH-acyl and
acyl represents an acyl radical of a carboxylic acid.

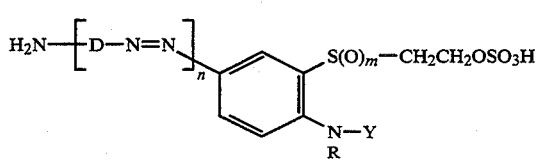

(37)

wherein
n=0 or 1 and
m=0 or 2.

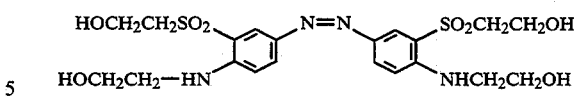

(38)

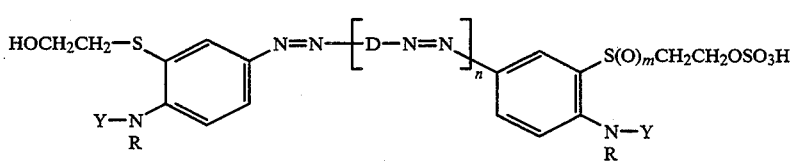

wherein
m=0 or 2.

(39)

wherein, in (36) to (39),

R, Y and D have the meaning given under formula (1).

The formulae shown are those of the free acids. The salts, in particular the alkali metal salts, such as sodium, potassium or lithium salts, are in general obtained in the preparation.

The new dyestuffs according to the invention are suitable for dyeing and printing materials containing hydroxyl groups and amide groups, in particular wool and cellulose materials. They are distinguished by a high reactivity and a high degree of fixing. The yellow, orange and brown dyeings and prints obtainable with these dyestuffs moreover are distinguished by a high stability of the fibre/dyestuff bond and by an outstanding stability towards oxidising agents, such as detergents containing peroxide or chlorine.

The dyestuffs can be employed either as solid finished forms or as concentrated solutions.

They are also suitable in mixtures with other reactive dyestuffs, in particular for trichromatic dyeings.

The preparation and use is to be illustrated with the aid of the following examples.

EXAMPLE 1

51.2 g of the azo compound of the formula are introduced into 250 ml of sulphuric acid monohydrate at 20° to 25° C. and are stirred until dissolved. The solution is then poured carefully onto an initial mixture of 200 ml of water and 400 g of ice. To precipitate the dyestuff as the tetrasodium salt, about 12 g of solid anhydrous sodium carbonate are added in portions at 0° to 10° C. The mixture can also be topped up with sodium chloride in order to bring the precipitation to completion. The orange-coloured precipitate is isolated by filtration with suction, stirred in 200 ml of water again and neutralised with sodium carbonate solution (pH 6). After spray drying, about 90 g of a dyestuff powder which has the structure

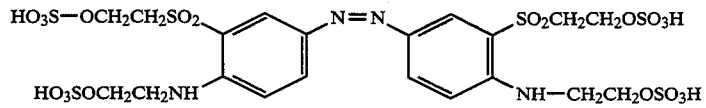

and dyes cotton in clear yellow colour shades result ($\lambda_{max}$=410, 436 nm (H$_2$O)).

EXAMPLE 2

54 g of 2,2'-(1,2-ethanediyl)bis[5-aminobenzenesulphonic acid] are stirred in 300 ml of water, 100 g of ice and 60 ml of concentrated hydrochloric acid, and then tetrazotised by addition of 70 ml of a 30% strength by volume aqueous sodium nitrite solution. The suspension is stirred at 5° C. for 1 hour. The excess nitrite is removed by addition of amidosulphonic acid after the reaction has ended. A solution of 65 g of 2-(2-hydroxyethylmercapto)-N-(2-hydroxyethyl)aniline in 50 ml of water/15 ml of concentrated hydrochloric acid is now added to the mixture. After 30 minutes, the pH is brought to pH 3.0 to 3.5 at about 10° C. with sodium carbonate solution in the course of one hour, and the mixture is stirred for four hours. The intermediate product which has precipitated, of the structure

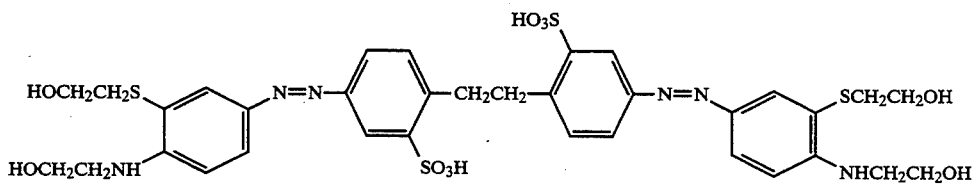

($\lambda_{max}$=440 nm) is isolated by filtration with suction, and the moist paste is further reacted directly. However, intermediate isolation can also be dispensed with and the coupling mixture can be oxidised directly.

For the oxidation, the moist paste is suspended in 400 ml of water, the pH is brought to 8.5 with sodium carbonate solution, and 0.2 g of sodium tungstate is added. The mixture is heated to 60° C. About 100 ml of a 30% strength aqueous hydrogen peroxide solution are now slowly metered in, without supplying further heat, the temperature rising to about 70° to 75° C. because of the heat of the reaction, and a solution results. After an after-stirring phase at 75° C. for one hour, the mixture is cooled to 20° C., and the dyestuff which has precipitated is isolated, after salting out, and dried. About 90 g of salt-containing product having the structure are obtained ($\lambda_{max}$=395, 435 (sh) nm).

This amount is introduced in portions into 250 ml of sulphuric acid monohydrate at 20°–25° C. and stirred for about 3 hours until dissolved. When the solution is discharged onto 200 ml of water/400 g of ice, the dyestuff precipitates as crystals. 20 g of solid sodium carbonate are introduced in portions, and the product is then filtered off with suction. The isolated product is stirred into 200 ml of water and the mixture is neutralised with sodium carbonate solution. After this mixture has been spray dried, about 150 g of salt-containing reactive dyestuff which has the structure

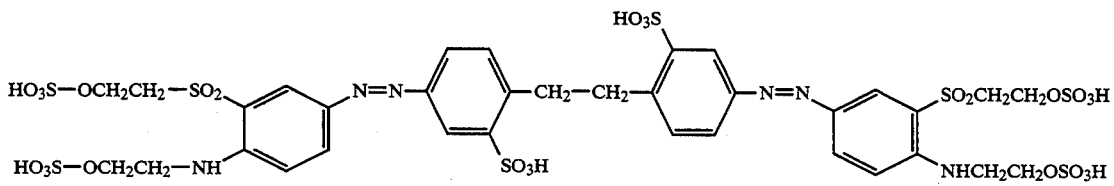

and dyes cotton in yellow colour shades are obtained ($\lambda_{max}$=389, 435(sh) nm).

Further interesting and important disazo dyestuffs and trisazo dyestuffs are obtained by varying the tetrazo component in Example 2:

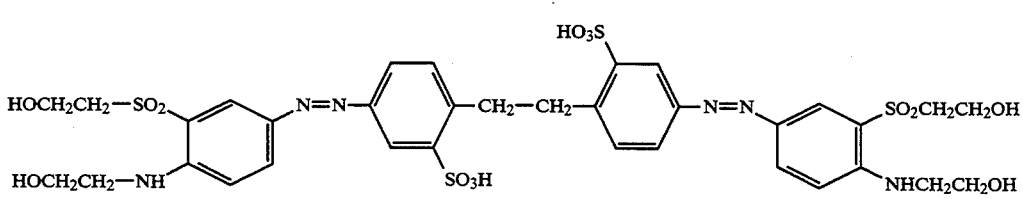

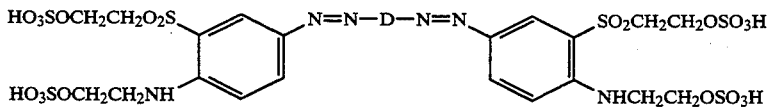

Example 3: D = 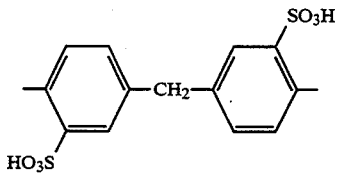

Example 4: D = 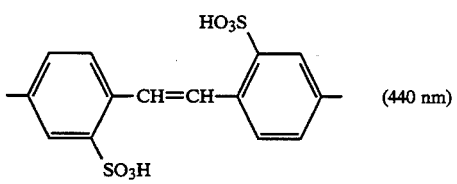 (440 nm)

Example 5: D = 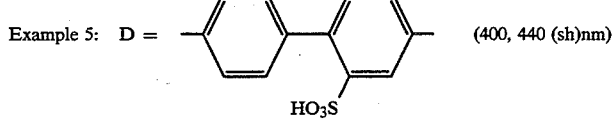 (400, 440 (sh)nm)

Example 6: D = 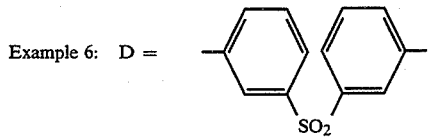

Example 7: D = 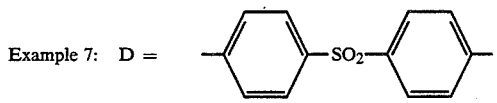

Example 8: D = 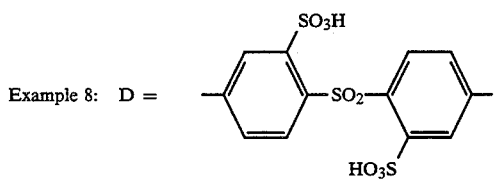

Example 9: D = 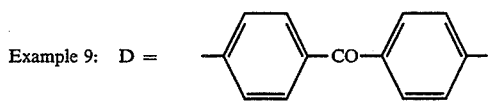

Example 10: D = 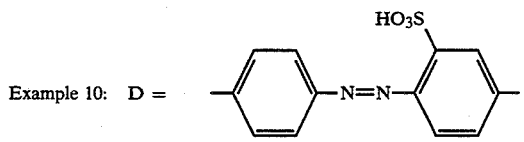

Example 11: D = 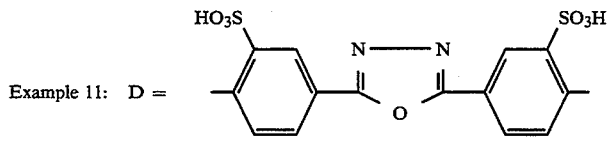

Example 12: D = 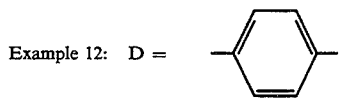

Example 13: D = 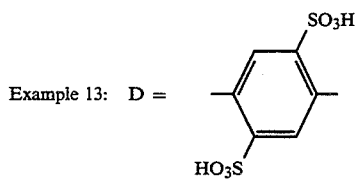

EXAMPLE 14

31.6 g of 2-amino-5-nitrobenzenesulphonic acid are dissolved in 250 ml of water and 40 ml of concentrated hydrochloric acid at 70° C. The mixture is cooled to 15° C. by adding ice, and diazotised with 35 ml of 30% strength by volume aqueous sodium nitrite solution. After an after-stirring time of 30 minutes at 15° C., the excess nitrite is removed with amidosulphonic acid. 32.5 g of 2-(2-hydroxyethylmercapto)-N-(2-hydroxyethyl)aniline are added to the mixture and the pH of the mixture is slowly brought to 4.5 in the course of 3 hours. The product is salted out with 30 g of sodium chloride, the precipitate is isolated, and the resulting paste is stirred in 250 ml of water again. After addition of 0.2 g of sodium tungstate, the mixture is heated to 70° C. and oxidation is carried out with 60 ml of 30% strength hydrogen peroxide solution at pH 8.5 to 9.0. During this operation, the temperature rises to 80° to 85° C. After cooling, the intermediate product which has precipitated, of the structure ($\lambda_{max}$=400 nm)

drying give about 75 g of the reactive dyestuff precursor having the structure

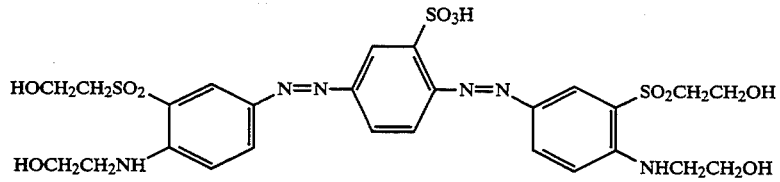

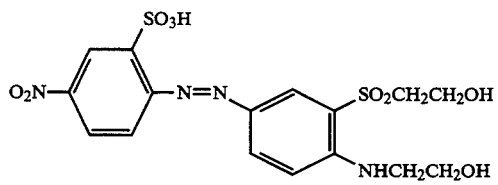

is isolated by filtration with suction.

These 130 g of moist nitoazo compound are heated to 80° C. in 300 ml of water and at pH 7.50 ml of an approximately 30% strength aqueous sodium hydrogen sulphide solution are then metered in over a period of 20 minutes, and the mixture is stirred at 80° C. for 2 hours. The end of the reduction is checked by thin layer chromatography.

Thereafter, 5 g of active charcoal are added and the hot solution is clarified. After cooling to 20° C., the mixture is brought to pH 5.0 and the product is salted out with 40 g of sodium chloride. Filtration with suction and drying give 70 g of salt-containing aminoazo intermediate product having the structure

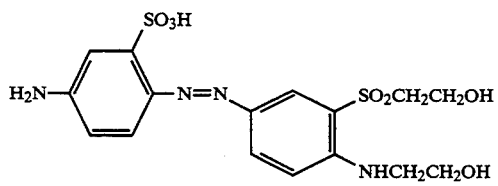

EXAMPLE 15

70 g of the intermediate product from Example 14 are stirred in 400 ml of water, 100 g of ice and 40 ml of concentrated hydrochloric acid and are diazotised by metering in about 25 ml of 30% strength by volume sodium nitrite solution at 5° to 15° C. After a subsequent stirring phase of two hours, 27 g of 2-(2-hydroxyethyl-mercapto)-N-(2-hydroxyethyl)aniline are added and the pH is increased slowly to 5.0 with sodium carbonate solution in the course of 3 hours (temperature: about 20° C.). When the coupling reaction has ended, 0.3 g of sodium tungstate is added, the mixture is heated to 70° C., the pH is brought to 8.0, and 50 ml of hydrogen peroxide solution are metered in such that the temperature does not rise above 80° C. The progress of the reaction is monitored by means of thin layer chromatography. When only traces of sulphoxide compound are still detectable, the mixture is cooled, whereupon the disazo-disulphone crystallises out. Isolation and

EXAMPLE 16

This precursor from Example 15 is also obtained when the intermediate compound having the structure ($\lambda_{max}$=400, 430(sh) nm)

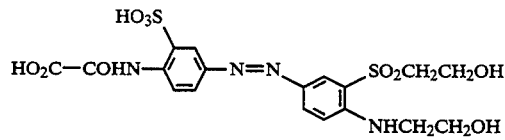

which is obtained by diazotisation of N-(4-amino-2-sulphophenyl)oxalic acid monoamide, coupling to 2-(2-hydroxyethylmercapto)-N-(2-hydroxyethyl)aniline and $H_2O_2$ oxidation, is hydrolysed under acid conditions, the resulting amino compound is diazotised, the diazotisation product is coupled to 2-(2-hydroxyethylmercapto)-N-(2-hydroxyethyl)aniline and the coupling product is oxidised with hydrogen peroxide.

EXAMPLE 17

The same reactive dyestuff precursor from Example 15 is also obtained as follows:

The azo dyestuff of the first coupling from Example 14, which has the structure ($\lambda_{max}$=383, 453 nm ($H_2O$))

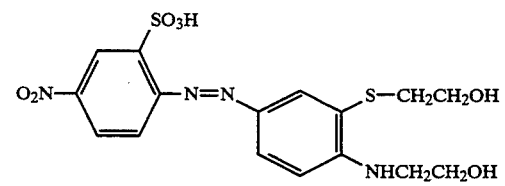

and is obtained as a moist paste, is taken up in 250 ml of water, and the mixture is heated to 80° C. at pH 7. About 50 ml of a 30% strength aqueous sodium hydrogen sulphide solution are added to the mixture, and the mixture is stirred at 80° C. for 2 hours. After the end of the reduction (monitoring by thin layer chromatography) and after addition of active charcoal, the mixture is clarified hot. The cooled solution is brought to pH 1 and the resulting suspension is diazotised with about 30 ml of a 30% strength by volume sodium nitrite solution at 5° C. The diazonium salt is coupled to the aniline coupling component, as already described above. A compound having the structure

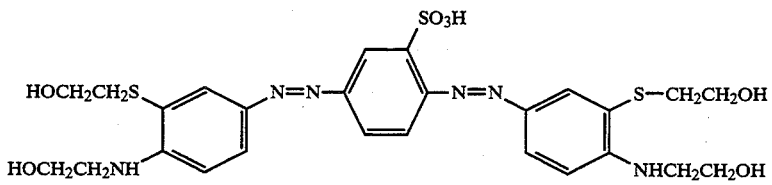

which contains two mercapto radicals and is isolated from the coupling mixture by filtration with suction,

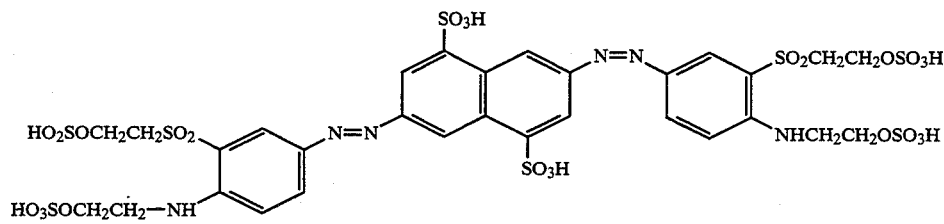

results. This compound is oxidised by means of hydrogen peroxide solution at 80° C. and pH 8.0 analogously to the instructions in Example 15. Nevertheless, a significantly increased consumption of oxidising agent is necessary. Isolation and drying give the reactive dyestuff precursor mentioned in Example 15.

EXAMPLE 18

75 g of the disazo-disulphone from Example 15 are introduced in portions into 200 ml of sulphuric acid monohydrate at 20° to 25° C. and stirred at 25° to 30° C. until dissolved. When the solution is discharged onto 200 ml of water/400 g of ice, the dyestuff already partly precipitates as crystals. More complete precipitation is achieved after metering in 30 to 40 g of solid sodium carbonate. The product is filtered off with suction and the paste isolated is stirred in 250 ml of water. After neutralisation to pH 6.0 by means of sodiumcarbonate solution, the mixture is spray dried or concentrated to dryness on a rotary evaporator. About 130 g of salt-containing reactive dyestuff having the structure

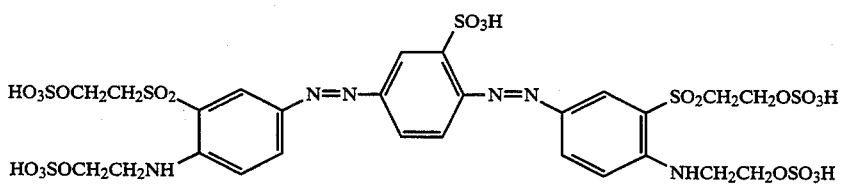

which dyes cotton in clear golden yellow shades are obtained.

Another variant of the preparation of Example 18 is reaction of the disazo-disulphone from Example 15 with oleum in a laboratory kneader. In this procedure, the reaction mixture is metered in at about 70° to 80° C./180 mbar, and the temperature is then increased to about 140° C./2 mbar. The mixture is concentrated to dryness, about 115 g of dyestuff powder being obtained.

EXAMPLE 19

If, instead of 2-amino-5-nitrobenzenesulphonic acid, 2-amino-6-nitro-4,8-naphthalenedisulphonic acid is now employed as the starting component in Example 14 and the procedure is analogous to Example 14, 15 or 17 and 18, a golden yellow reactive dyestuff having the structure

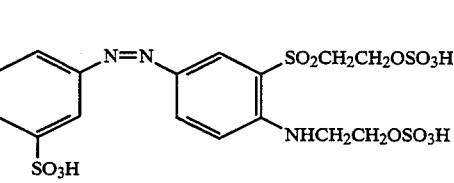

results.

EXAMPLE 20

70 g of the aminoazo intermediate product from Example 14 are introduced into 200 ml of sulphuric acid at 20° to 25° C. and the mixture is stirred at 30° C. for 2 hours. The solution is discharged carefully onto an initial mixture of 200 ml of water/400 g of ice. To precipitate the disodium salt, 20 g of solid sodium carbonate are added in portions and, if appropriate, the product is salted out with various amounts of sodium chloride. The orange-yellow precipitate is isolated and dissolved in 300 ml of water at pH 6.0. The fibre-reactive intermediate product having the structure ($\lambda_{max}=403$, 440(sh) nm)

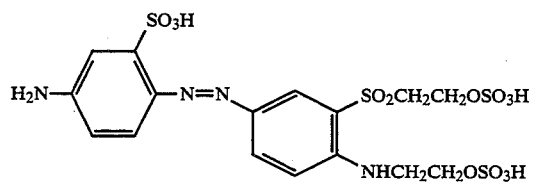

is most favourably reacted further in solution.

EXAMPLE 20 A

Phosgene is passed into the solution of the intermediate product from Example 19, under appropriate safety precautions, at 30° C. and pH 6 to 6.5 until no further free colour base is detectable.

The pH is kept constant by uniform addition of sodium carbonate solution. When the reaction has ended, the mixture is subsequently stirred at 40° C. for 2 hours in order to destroy residual phosgene (pH 6.0). It is cooled to 20° C. and the product is salted out with 30 g of sodium chloride. Isolation and drying give about 125 g of an orange-yellow salt-containing dyestuff powder which has the structure

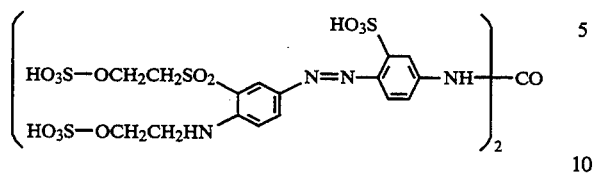

and dyes cotton in yellow colour shades.

EXAMPLE 20 B

The solution from Example 19 is reacted with 13 g of cyanuric chloride at 10° to 15° C. and a constant pH of 6.0 to 6.5. The pH is controlled with sodium carbonate solution. After about 2 hours, the reaction has ended. The mixture is stirred at 30° C. for a further hour, the solution is clarified by means of a filter aid, and the dyestuff is salted out by addition of adequate amounts of sodium chloride. About 135 g of salt-containing reactive dyestuff which has the structure

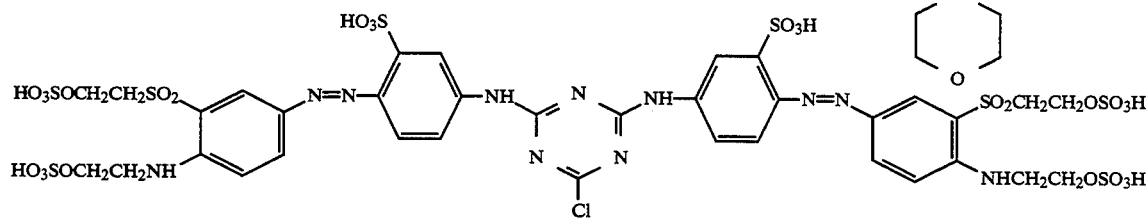

and dyes cotton in yellow colour shades are isolated.

If, instead of cyanuric chloride, equimolar amounts of cyanuric fluoride, 2-(2-sulphoethyl)amino-4,6-dichlorotriazine, 2-(3-sulphophenyl)amino-4,6-difluorotriazineor other comparable dihalogenotriazine derivatives are chosen in Example 20 B, the following interesting yellow dyestuffs are obtained:

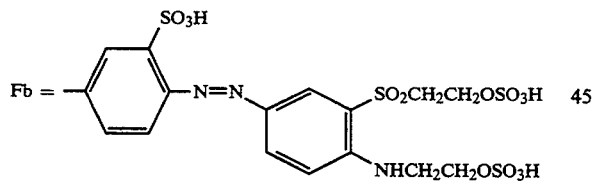

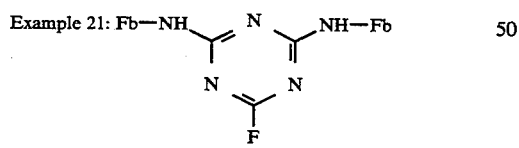

Example 22: 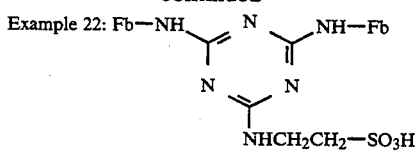

Example 23: 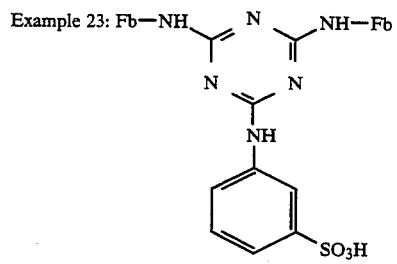

Example 24: 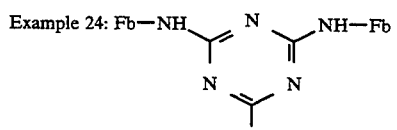

Example 25: 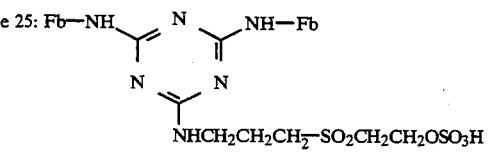

Example 26: 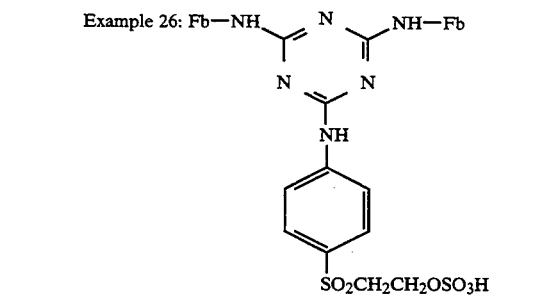

By varying the coupling component in the preceding examples, the following similarly important reactive dyestuff examples are accessible analogously:

Example 27:
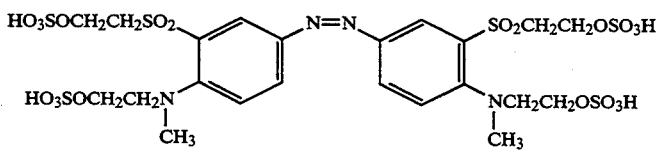

-continued
Example 28:
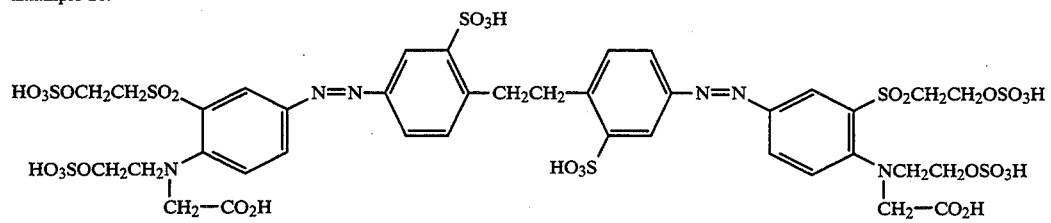
Example 29:
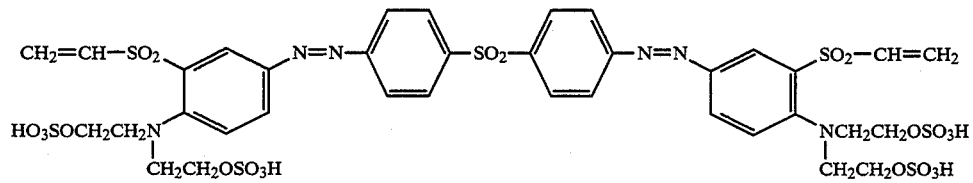
Example 30:
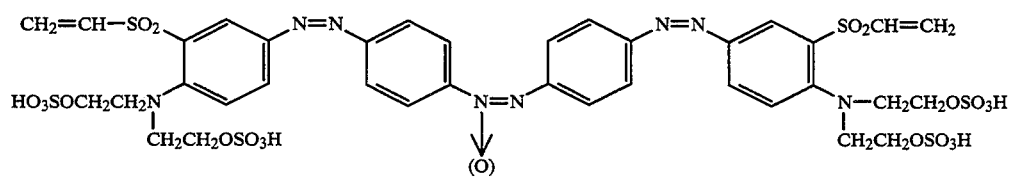
Example 31:
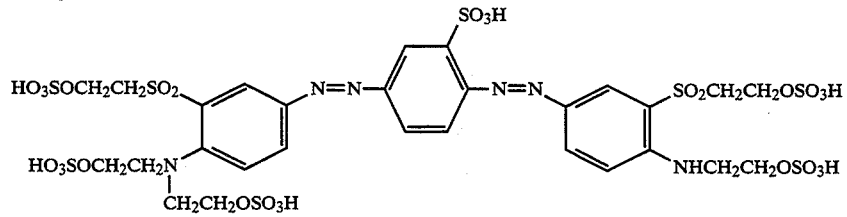
Example 32:
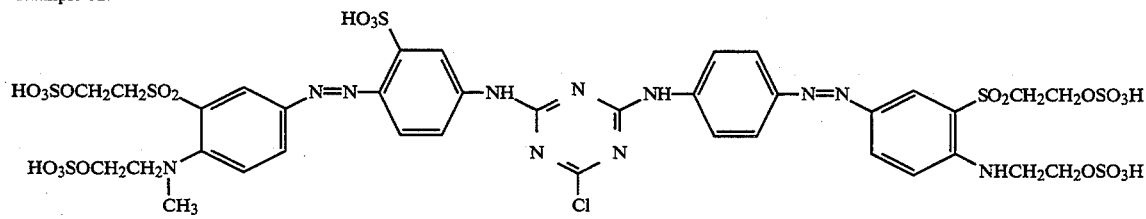
Example 33:
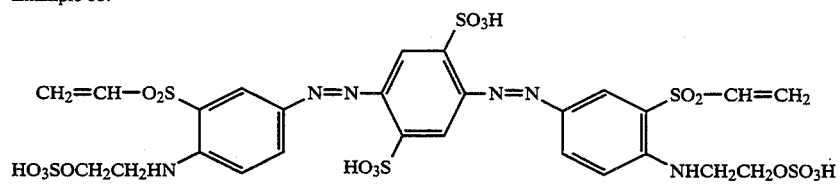
Example 34:
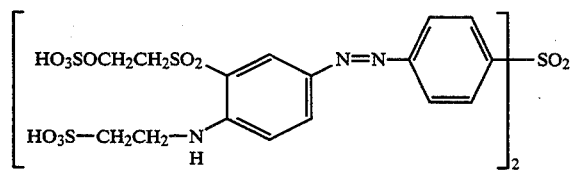
Example 35:

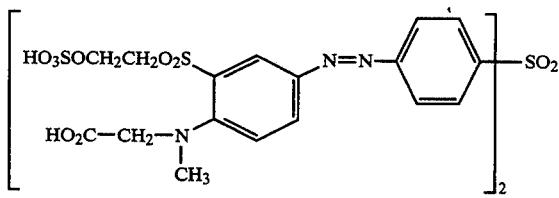

Example 36:

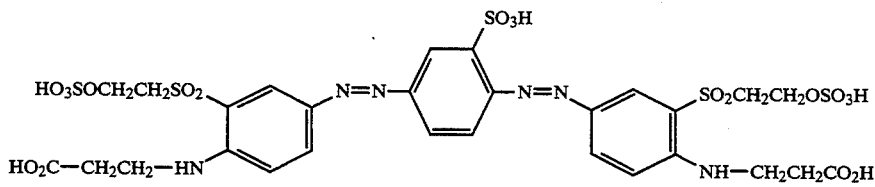

Example 37:

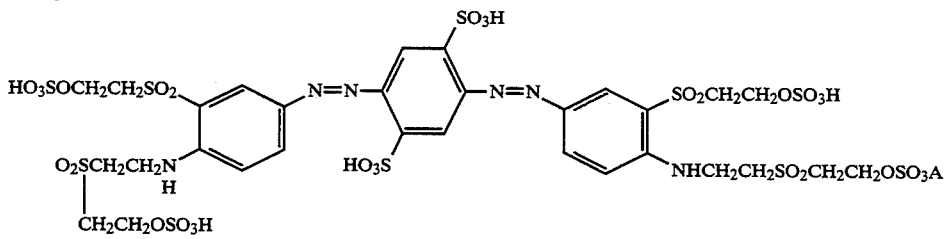

Example 38:

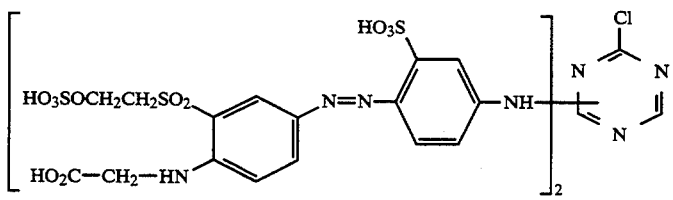

If the coupling component in Example 2 is varied, the following valuable reactive dyestuffs which dye cotton in clear yellow colour shades are obtained:

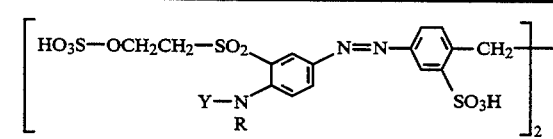

| Example | R | Y |
|---|---|---|
| 39 | H | CH$_2$CH$_2$SO$_3$H |
| 40 | H | CH$_2$—SO$_3$H |
| 41 | H | CH$_2$CO$_2$H |
| 42 | H | CH$_2$CH$_2$CO$_2$H |
| 43 | CH$_2$CO$_2$H | CH$_2$CO$_2$H |
| 44 | H | CH$_2$—C$_6$H$_4$—SO$_3$H |
| 45 | H | CH$_2$—C$_6$H$_4$—SO$_3$H (meta) |

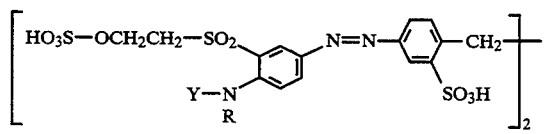

| Example | R | Y |
|---|---|---|
| 46 | H | CH$_2$CH$_2$SO$_2$CH$_2$CH$_2$OSO$_3$H |
| 47 | CH$_3$ | CH$_2$CH$_2$SO$_3$H |
| 48 | CH$_3$ | CH$_2$CH$_2$OSO$_3$H |

EXAMPLE 49

The azo dyestuff of the first coupling from Example 14, which has the structure described for the first intermediate product in Example 17, is dissolved, as a moist paste, in 500 ml of water at 60° C. A pH of 12.0 is established with about 35 ml of concentrated sodium hydroxide solution, and 20 g of dextrose are then added. The reduction reaction proceeds slightly exothermically. The mixture is stirred at 65°–70° C. for a further hour, and then cooled to 20° C. and brought to pH 6.0. The azo/azoxy dyestuff which has precipitated, which has the structure ($\lambda_{max}$=384, 467 nm (H$_2$O))

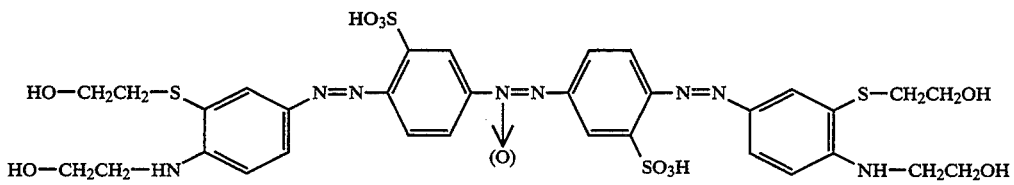

is filtered off with suction, and the paste isolated is stirred into 400 ml of water.

After heating to 70° C. and addition of 0.2 g of sodium tungstate, the pH is corrected to 6.0 and 60 ml of a 35% strength aqueous hydrogen peroxide solution are then slowly added dropwise. During this procedure, the reaction temperature rises to 80°–85° C. The pH is kept at 5.0–6.0 by addition of sodium carbonate. After 45 minutes, the oxidation reaction has ended.

The mixture is cooled to 20° C. and filtered with suction and the product isolated is dried. About 60 g of salt-containing product which has the structure ($\lambda_{max}=451$ nm ($H_2O$))

and the mixture is subsequently stirred for one hour. This solution is then discharged onto an initial mixture of 100 ml of saturated sodiumchloride solution and 300 g of ice. The dyestuff which has precipitated is filtered off with suction. The acid paste isolated is stirred into 200 ml of water, and the pH is brought to 5.5 with solid sodiumbicarbonate. The dyestuff solution is concentrated to dryness on a rotary evaporator, and the resulting still moist dyestuff is dried. About 55 g of reactive dyestuff, containing sodium sulphate, having the structure ($\lambda_{max}=454$ nm ($H_2O$))

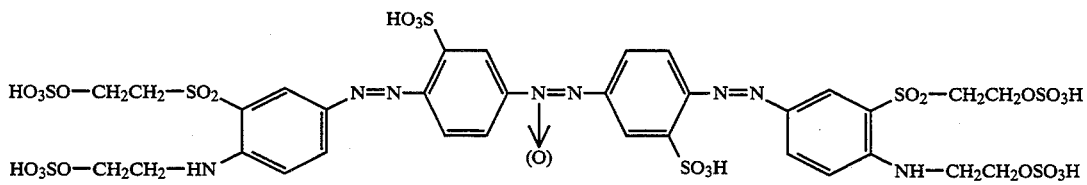

which dyes cotton in reddish-tinged brown shades, are obtained.

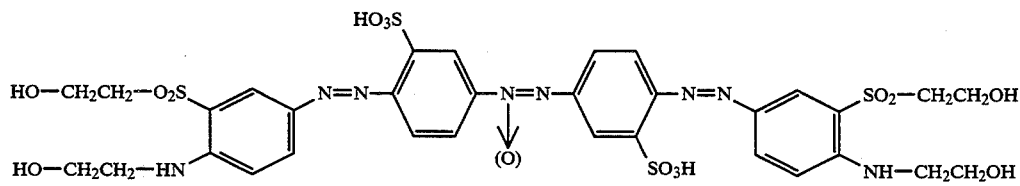

result.

35 g of this dyestuff, which is not fibre-reactive, are introduced in portions into 100 ml of sulphuric acid monohydrate at 15°–20° C. and stirred until dissolved. 20 ml of 20% strength oleum are added at 25°–30° C., Example 30 and the following dyestuff examples are also accessible analogously to the preparation instructions of Example 49 by varying the diazo or coupling component.

Example 50

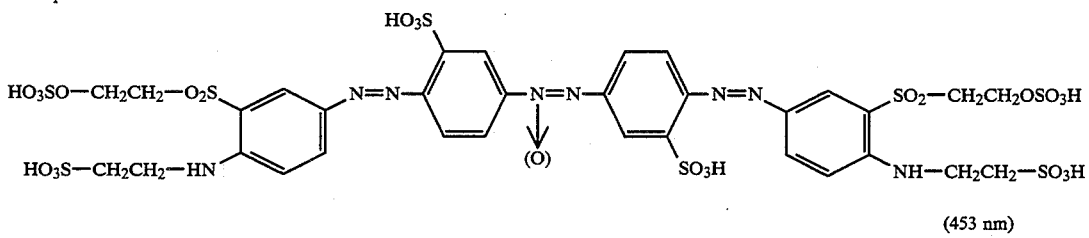

(453 nm)

Example 51

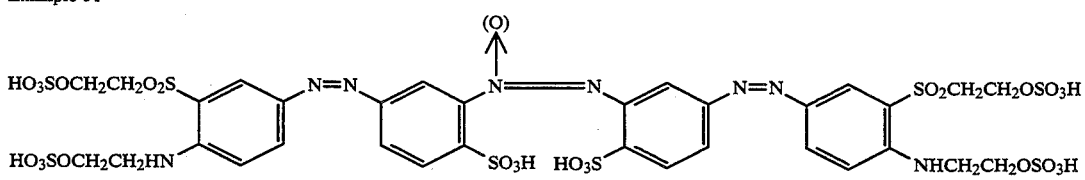

Example 52

-continued

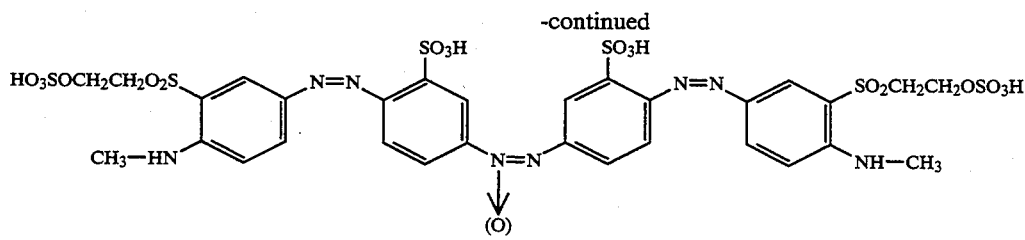

Example 53

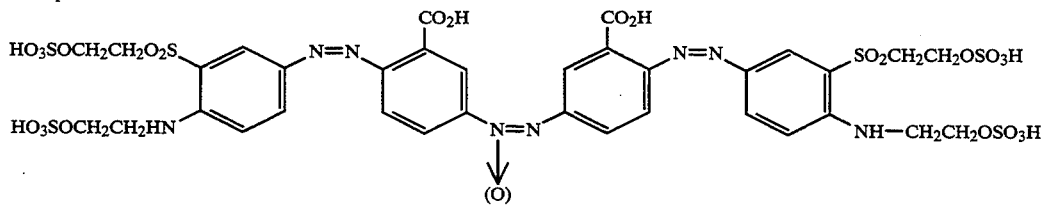

Dyeing Instructions 1

2 parts of the dyestuff obtainable according to Example 18 are dissolved in 100 ml of water. The solution is added to 1900 parts of cold water, 60 parts of sodium chloride are added, and 100 parts of a cotton fabric are introduced into this dyebath.

The temperature is increased to 50° C. 40 parts of calcined sodium carbonate and a further 60 parts of sodium chloride being added after 30 minutes. The temperature is kept at 50° C. for 30 minutes, the fabric is rinsed, the dyeing is then soaped in a 0.3% strength boiling solution of an ion-free detergent for 15 minutes, and the fabric is rinsed and dried. A golden yellow dyeing having good fastness properties is obtained.

Dyeing Instructions 2

4 parts of the reactive dyestuff prepared in Example 2 are dissolved in 50 parts of water. 50 parts of a solution containing 5 g of sodium hydroxide and 10 g of calcined sodium carbonate per liter are added to this solution. A cotton fabric is padded with the resulting solution such that it takes up 70% of its weight, and is then wound onto a beam. The cotton fabric is kept in this way at room temperature for 3 to 12 hours. Thereafter, the dyed goods are rinsed, soaped at the boil for a quarter of an hour with a non-ionic detergent, rinsed again and dried. A yellow dyeing having good fastness properties is obtained. Deep black dyeings are obtained if suitable mixtures of Dyestuff Example 18 with the dyestuff of the formula

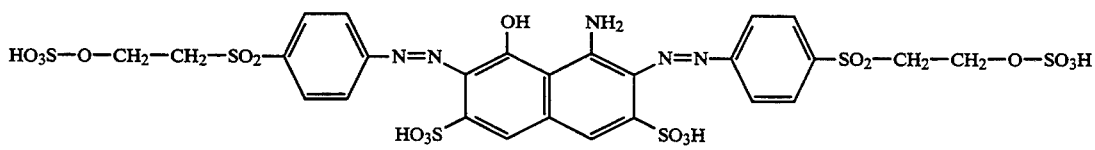

or a salt thereof are employed.

Green dyeings result if suitable mixtures of Dyestuff Example 2 with the dyestuff of the formula

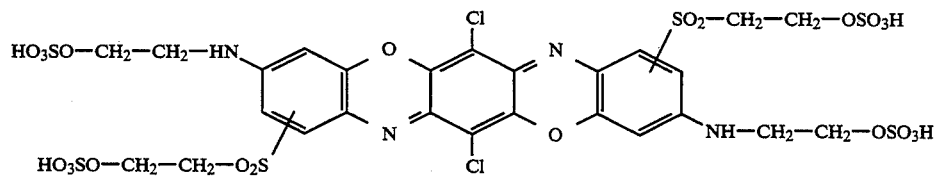

or a salt thereof are employed.

I claim:

1. A polyfunctional fibre-reactive azo dyestuff which, in the form of the free acid, corresponds to the formula

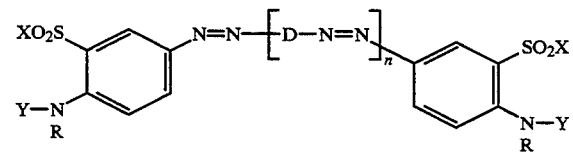

wherein n is 0 or 1,

X is $CH=CH_2$ or $CH_2CH_2OSO_3H$,

Y is H, $C_1$-$C_6$-alkyl; $C_1$-$C_6$-alkyl which is substituted by Cl, OH, CN, $CO_2H$, $OSO_3H$, $SO_3H$, $SO_3X$ or $C_1$-$C_4$-alkoxy, allyl, cycloalkyl or cycloalkyl which is substituted by $CO_2H$ or $SO_3H$, benzyl or benzyl which is substituted by OH, $CO_2H$ or $SO_3H$, R is H, $C_1$-$C_4$-alkyl, $C_1$-$C_4$-alkyl which is substituted by Cl, OH, CN, $CO_2H$, $OSO_3H$, $SO_3H$, $SO_2X$ or $C_1$-$C_4$-alkoxy, allyl, benzyl or benzyl which is substituted by OH, $CO_2H$ or sulpho, wherein NR—Y can represent a saturated heterocyclic ring, and D is a bivalent aromatic or heteroaromatic radical selected from the group consisting of

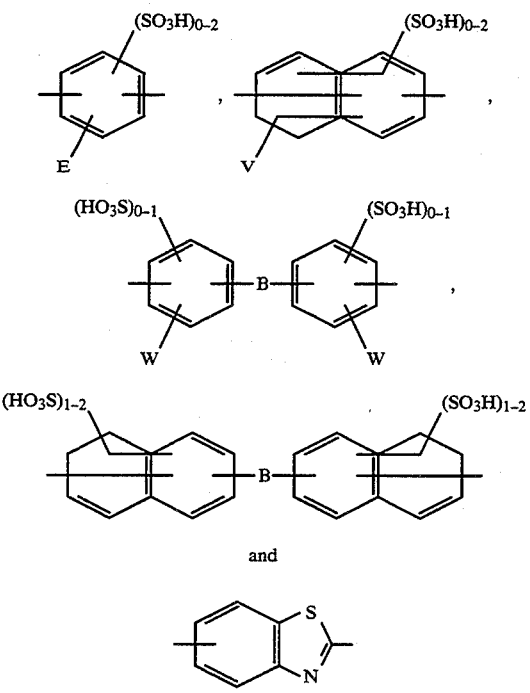

and

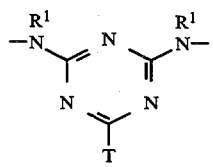

where E, V, and W each independently is hydrogen or a substitutent typical for carbonocyclic rings, and
B is a direct bond or a bridge member.
2. Dyestuff: according to claim 1, wherein n is 1.
3. Dyestuff according to claim 1, wherein
B is $CH_2$, $CH_2$—$CH_2$, CH=CH, O, S, SO, $SO_2$, CO, $CO_2$, $OCH_2CH_2O$, $CH_2$—O—$CH_2$, $CH_2CH_2OCH_2CH_2$, NHCO, NHCONH, $NR^1$, N=N, N=N→O, O←N=N→O, NHCOCONH,

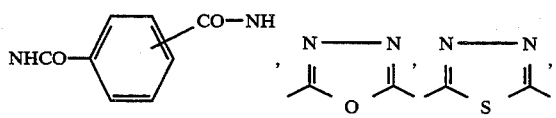

or a triazinyl radical having the structure

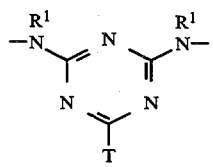

wherein
$R^1$ each independently is H or $C_1$-$C_4$-alkyl and
T is F, Cl, $OR^2$, $SR^2$ or $NR^3R^4$,
$R^2$ is H, $C_1$-$C_6$-alkyl, $C_1$-$C_6$-alkyl which is substituted by OH, halogen, $C_1$-$C_4$-alkoxy, $CO_2H$, $SO_3H$ or $OSO_3H$, cyclohexyl, furfuryl, phenyl, phenyl which is substituted by ON, $CO_2H$, $SO_3H$, $C_1$-$C_4$-alkyl or $C_1$-$C_4$-alkoxy, or naphthyl which is substituted by OH, $CO_2H$ or $SO_3H$ or is unsubstituted,
$R^3$ and $R^4$ each independently is hydrogen, $C_1$-$C_6$-alkyl, $C_1$-$C_4$-alkenyl, $C_1$-$C_6$-alkyl which is substituted by halogen, OH, $CO_2H$, $SO_3H$, $OSO_3H$, methoxy, ethoxy, $SO_2Z$ or $OCH_2CH_2SO_2Z$, cyclohexyl, cyclopentyl, benzyl, phenyl or naphthyl, or phenyl, benzyl or naphthyl which is substituted by $C_1$-$C_4$-alkyl, $C_1$-$C_4$-alkoxy, halogen, $CO_2H$, $SO_3H$, $SO_2Z$ or $CH_2SO_2Z$, and wherein $R^3$ and $R^4$, together with the N atom, can form the radical of a 5- or 6-membered heterocyclic ring, and
Z is CH=$CH_2$, $CH_2CH_2OSO_3H$ or $CH_2CH_2Cl$.
4. Reactive dyestuff according to claim 1 corresponding to one of the following fomulae

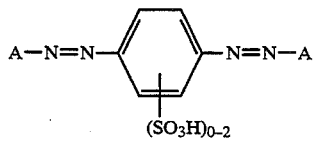

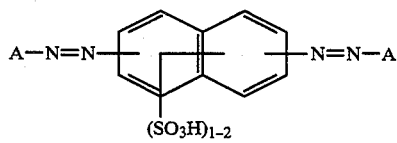

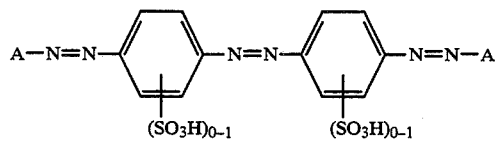

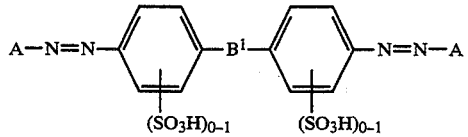

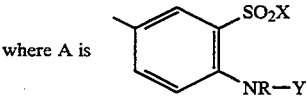

where A is
and $B^1$ is a direct bond or $CH_2CH_2$, CH=CH, CO, $SO_2$, NHCONH or a triazinyl radical having the structure

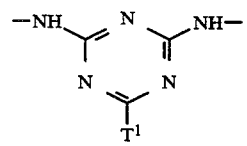

wherein
$T^1$ is Cl, F, OH or $NR^3R^4$
X is CH=$CH_2$ or $C_2H_4OSO_3H$,
R is H, $C_1$-$C_4$-alkyl, $C_1$-$C_4$-alkyl which is substituted by Cl, OH, CN, $CO_2H$, $OSO_3H$, $SO_3H$, $SO_2X$ or $C_1$-$C_4$-alkoxy, allyl, benzyl or benzyl which is substituted by OH, $CO_2H$ or sulpho,
wherein NR—Y can represent a saturated heterocyclic ring, and
$R^3$ and $R^4$ each independently is hydrogen, $C_1$-$C_6$-alkyl, $C_1$-$C_4$-alkenyl, $C_1$-$C_6$-alkyl which is substituted by halogen, OH, $CO_2H$, $SO_3H$, $OSO_3H$, methoxy, ethoxy, $SO_2Z$ or $OCH_2CH_2SO_2Z$,cyclohexyl, cyclopentyl, benzyl, phenyl or naphthyl, or phenyl, benzyl or napthyl which is substituted by $C_1$–$C_4$-alkyl, $C_1$–$C_4$-alkoxy, halogen, $CO_2H$ $SO_3H$, $SO_2Z$ or $CH_2SO_2Z$, and wherein $R^3$ and $R^4$, together with the N atom, can form the radical of a 5- or 6-membered heterocyclic ring.

5. Process for dyeing or printing materials containing hydroxyl groups or amide groups with a reactive dyestuff, by applying thereto a reactive dyestuff according to claim 1.

* * * * *

UNITED STATES PATENT AND TRADEMARK OFFICE
CERTIFICATE OF CORRECTION

PATENT NO. : 5,434,251
DATED : July 18, 1995
INVENTOR(S) : Herd, Karl-Josef

It is certified that error appears in the above-indentified patent and that said Letters Patent is hereby corrected as shown below:

Col. 34, line 49  Delete " $SO_3X$ " and substitute -- $SO_2X$ --

Col. 35, line 62  Delete " ON " and substitute -- OH --

Signed and Sealed this

Fourteenth Day of November, 1995

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,434,251
DATED : July 18, 1995
INVENTOR(S) : Karl-Josef Herd

It is certified that error appears in the above-indentified patent and that said Letters Patent is hereby corrected as shown below:

Col. 3, line 5   Delete "  " and substitute

Col. 35, line 7   Delete " 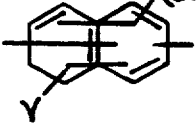 " and substitute -- 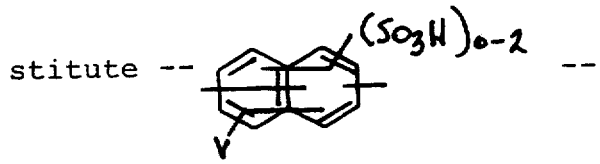 --

Col. 35, line 20   Delete " 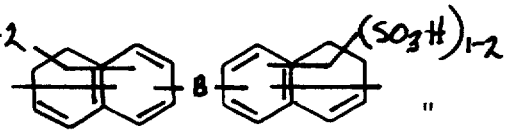 "

and substitute

UNITED STATES PATENT AND TRADEMARK OFFICE
CERTIFICATE OF CORRECTION

PATENT NO. : 5,434,251
DATED : July 18, 1995
INVENTOR(S) : Karl-Josef Herd

It is certified that error appears in the above-indentified patent and that said Letters Patent is hereby corrected as shown below:

Col. 35, line 30 Cont'd 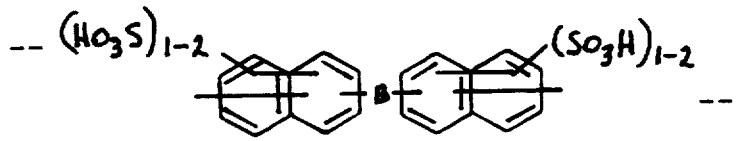

Signed and Sealed this

Twelfth Day of November, 1996

*Attest:*

BRUCE LEHMAN

*Attesting Officer    Commissioner of Patents and Trademarks*